United States Patent

Vandenberghe

Patent Number: 5,431,873
Date of Patent: Jul. 11, 1995

[54] TIRE MOLD AND PROCESS FOR MAKING THE MOLD

[75] Inventor: Paul Vandenberghe, Chateaugay, France

[73] Assignee: Compagnie Generale Des Etablissements Michelin - Micheline & Cie, Clermont-Ferrand Cedex, France

[21] Appl. No.: 131,710

[22] Filed: Oct. 5, 1993

[30] Foreign Application Priority Data

Oct. 7, 1992 [FR] France ................. 92 12247

[51] Int. Cl.⁶ .............. B29C 33/10; B29C 41/08
[52] U.S. Cl. ................. 264/226; 249/114.1; 249/116; 264/315; 264/326; 425/812; 427/135
[58] Field of Search ............ 425/812, 35, 49; 264/315, 326, 219, 226; 427/133, 135; 249/114.1, 116

[56] References Cited

U.S. PATENT DOCUMENTS

| | | |
|---|---|---|
| 3,692,090 | 9/1972 | Brobeck et al. ............ 425/812 |
| 4,120,930 | 10/1978 | Lemelson ................ 264/219 |
| 4,347,212 | 8/1982 | Carter . |
| 4,426,497 | 1/1984 | Kent . |
| 4,691,431 | 9/1987 | Hayata . |
| 5,234,326 | 8/1993 | Galli et al. ............... 425/812 |

FOREIGN PATENT DOCUMENTS

| | | |
|---|---|---|
| 250941 | 5/1963 | Australia . |
| 1142877 | 9/1957 | France . |
| 1200518 | 9/1965 | Germany . |
| 1944602 | 3/1971 | Germany . |
| 3231188 | 3/1983 | Germany . |
| 59-201813 | 11/1984 | Japan . |
| 61-61814 | 3/1986 | Japan . |
| 4-191013 | 7/1992 | Japan ................. 264/219 |
| 664730 | 1/1952 | United Kingdom . |
| 843300 | 8/1960 | United Kingdom . |

*Primary Examiner*—Mathieu D. Vargot
*Attorney, Agent, or Firm*—Brumbaugh, Graves, Donohue & Raymond

[57] ABSTRACT

The tire mold having a surface 5 of open porosity which covers at least in part certain of the molding surfaces 10 and 20 in order to assure the venting of the mold.

15 Claims, 2 Drawing Sheets

TIRE MOLD AND PROCESS FOR MAKING THE MOLD

BACKGROUND OF THE INVENTION

The present invention relates to tire molds and, more specifically, to techniques for venting such molds.

It is known that it is necessary to eliminate the air which remains imprisoned between the molding surface of the molds and the raw rubber of the tire. In order to assure the complete venting of the mold, current practice is to provide small holes approximately everywhere on the molding surface where there is the danger of gas remaining imprisoned without being able to escape between the parts of the mold, for instance without being able to escape between shell and sectors, or between the sectors themselves.

These venting devices have two types of disadvantages. On the one hand, they leave an undesirable marking on the surface of the tire after its vulcanization and removal from the mold; the flow of the rubber into the interior of the holes causes the creation of small roughnesses or even larger tubular protuberances. Furthermore, these vent holes can easily become clogged, in particular because the rubber which has flowed therein may remain caught in the hole after vulcanization. Cleaning of the mold is then indispensable, and it is complicated by the fact that it impossible to dissolve the clogging materials chemically.

For this reason, the state of the art also knows a large number of more elaborate proposals, all directed at solving this problem. Mention may be made of very complicated vents (U.S. Pat. Nos. 4,347,212 or 4,426,497), in a mold made by stacking plates in order to obtain natural venting between the plates (U.S. Pat. No. 4,691,431), or else the use of porous materials for the production of the mold (GB Patent 843 300) or a part thereof (WO 88/01927).

However, despite the extensive research which has been carried out on this subject, the problem still remains that all the solutions proposed up to the present time either hamper the venting too much in order for it to be effective or cannot be used in the tread, at least with certain types of tread patterns, such as those with many sipes cleats, or else they are too expensive or too complicated to use on an industrial scale (aspiration by partial vacuum).

SUMMARY OF THE INVENTION

The present invention proposes producing a surface film which makes it possible to create the necessary venting without creating geometrical defects on the surface of the tire.

In accordance with the invention, a special film is produced on the molding surface of the mold, the film comprising a sufficiently open porosity, the pores of which on the surface of the mold are of a size of less than 0.05 mm, in order to channel the air along the entire molding surface and bring it towards the transverse surfaces of the parts of the mold to the periphery of the molding faces or else to any other place where the air finds a possibility of escaping towards the outside of the mold. Gaps which naturally exist between the different parts of the mold are preferably employed in order to assure the venting.

In fact, a tire mold comprises several elements (that is to say, several separate parts), each having a molding face bounded on its surface by non-molding transverse faces. In the so-called "closed mold" position, the molding faces together define a cavity which corresponds exactly, in shape and size, to the tire to be molded. It is, in fact, a negative of the tire to be produced.

The invention can be applied both to molds which assure the molding only of the outer surface of the tires or to rigid-core molds which mold the entire surface of the tires, including therein the surface subjected to the inflation pressure, or to molds for treads in the recapping industry, and, in order to define the scope of the invention, it will be considered that here also a mold for tires is concerned.

At least one of these elements, for instance, a shell, or all the sectors, is constituted by a form made of nonporous solid material such as steel, or an aluminum casting. In practice, this form is an ordinary part of a mold which is covered on its surface by a porous film such as indicated above. The surface film may be produced only over a part of the molding surface, for instance only at the places where the evacuation of air presents a problem or else if it is desired to use the invention to produce zones of very different appearance on the surface of the tire.

The invention also extends to a method of molding a tire by means of a mold at least one element of which comprises a porous surface film on at least a part of its molding face, within which element the venting is effected by causing the air to travel on the inside of said porous film in order to channel the air up to vent path by which it can reach the outside of the mold.

DESCRIPTION OF DRAWINGS

The accompanying figures and the following description will make it possible better to understand the invention by a detailed explanation of two embodiments, which of course are not limitative.

DESCRIPTION OF PREFERRED EMBODIMENTS

Figure 1:
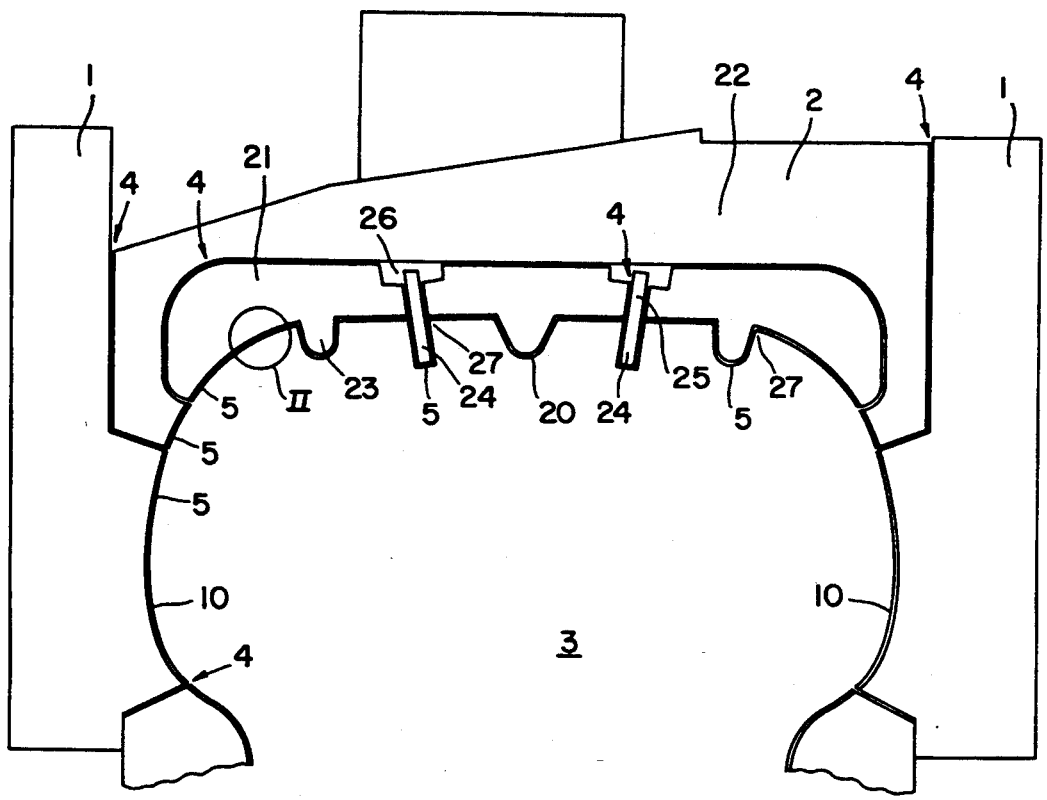
FIG. 1 is meridian radial section through a sector mold.

FIG. 1 shows a tire mold, the elements of which are, as is well known, the two side shells 1 and the outer sectors 2 constituting a peripheral ring. The mold is shown in so-called "closed mold" position. It defines a toroidal cavity 3 the shape of which corresponds precisely to the shape of the tire to be molded. The venting of such a mold is, of course, possible between the elements of the mold between which, in closed position, even under the action of a closure force imparted by the vulcanization press, a sufficient gap remains to permit the air to escape from the inside of the mold towards the outside thereof. The gap between sectors 2 and shells 1 has been intentionally exaggerated in FIG. 1 in order clearly to show the slits 4 which can collect the air all along the periphery of the molding surfaces 10 and 20. The sectors 2 have a mold packing 21 made of aluminum casting, fastened on a cast-iron support 22.

The specific surface film 5 of the invention is indicated in heavy line in FIG. 1. In this example, it is a surface covering. The elements of the mold (shells 1 and sectors 2) are forms made of nonporous solid material—machined steel for the shells 1 and aluminum casting for the packings 21 of the sectors 2. These forms are made precisely in the same manner as in the case of a conventional mold, from which one can start in order to apply the present invention. We merely point out that it may be desirable, when dimensioning the elements of the mold, to take into account the thickness of the surface film, which is preferably between 0.1 and 0.5 mm.

The tests carried out by the applicant have shown that ceramic powders lend themselves excellently to the production of air-drain surface coverings. Mention may be made of ceramic powders of oxides, nitrides, or aluminum, titanium or silicon carbides. In particular, the submicronic titanium powder marketed by the CEREX Company, Annemasse, France, gives very interesting results. As another powder which can be used, mention may be made of metal powders such as, for instance, a powdered chromium, aluminum or stainless steel.

The method for the production of the coated elements is as follows (one starts from shells 1 and sectors 2 obtained by conventional methods):

1. The elements to be covered are prepared by sanding or shot-blasting with an abrasive in order to promote the attachment of the coating;
2. The TiN powder is sprayed-on by a plasma torch, adjusted experimentally to leave intentionally a total porosity of at least 10% openings as compared with the total volume, and preferably 20%, which porosity may be open to the extent of at least 30% by volume of the porous film, and preferably at least 60%; a deposit of uniform thickness is easily obtained by imparting to the form to be coated controlled movements in all three directions in space during the spraying;
3. If necessary, the covered form is subjected to blasting with shot of mild steel or with glass balls in order to limit the surface roughness; as this shot blasting is effected on a fragile and not ductile material, it constitutes a finishing operation which causes a slight removal of material breaking off the peaks of the covering and does not lead to any closing of pores.

One thus obtains a surface covering 5 of porous structure which can completely cover all the molding surfaces of the mold, including the ribs 23 and the blades 24 of the packing 21. The air can find a path therein in order to reach the conventional vent paths, such as the gap between elements, if necessary by moving around the ribs 23. Thus, even in the bottom 27 of the recesses corresponding on the form at the edges of the rubber slabs which are customarily seen in tire patterns for passenger-car tires, the air can never remain permanently entrapped by the molding. One can, therefore, produce a mold which is entirely free of vent holes debouching on the surface of the molding, and one therefore obtains a venting without any trace on the vulcanized tire.

The shot blasting indicated above is for the purpose of imparting a less dull appearance to the molded rubber and/or making it possible to facilitate removal from the mold. It decreases the resultant roughness. It appears desirable that, in any event, it be such that $R_a$ is less than 6 $\mu$m and $R_t$ less than 40 $\mu$m. These measures of roughness are made according to French Standard designated NFE 05-015 as measured by an instrument manufactured by Perten Seinpruf GmbH under the mark Perthometer S6R.

Figure 2:
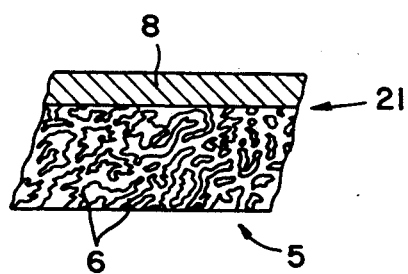
FIG. 2 is an enlargement of the zone identified by the circle II in FIG. 1.
Figure 3:
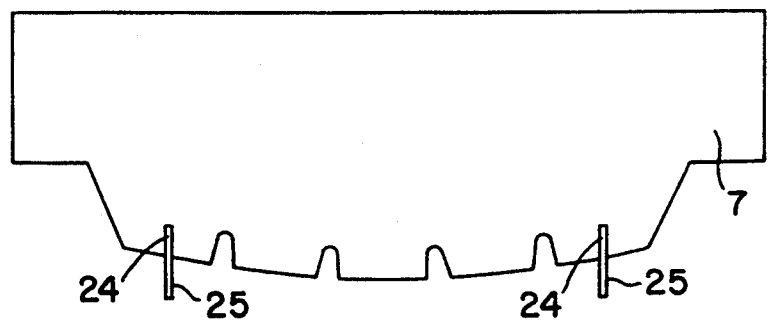
FIGS. 3 to 6 illustrate a method of making a variant embodiment of a sector mold.
Figure 4:
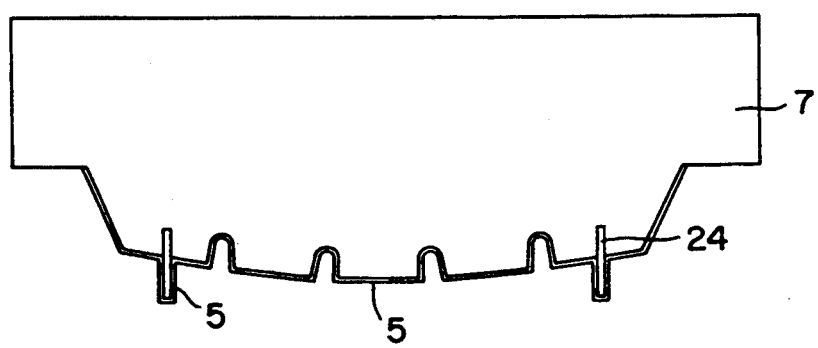
Figure 5:
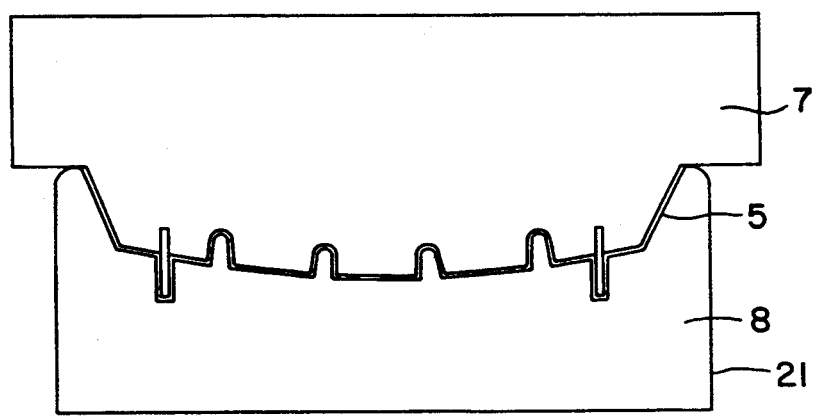
Figure 6:
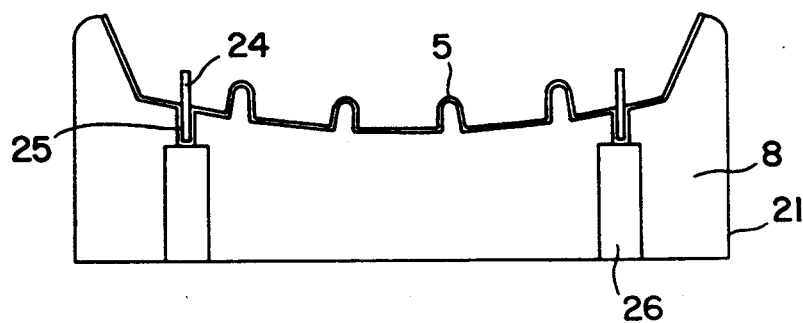

The diagram of FIG. 2 shows how the air finds a path to escape to outside the mold. This is an enlargement of a portion identified by II in FIG. 1. The film 5 covering the aluminum 8 of a packing 21 can be noted. The open porosity creates continuous channels 6. On the surface of the mold, the cross section of the channels always remains less than 50 $\mu$m, that is to say, the largest size, measured on the surface of the mold, of the largest pore is less than 50 $\mu$m; this assures the passage of the air and prevents the flow of the raw rubber, so that the porosity is not plugged up. The dirtying of the mold therefore remains very slight.

The part of the surface film, the porosity of which is closed, also participates in the elimination of the air by a capacity effect: a part of the air to be evacuated can accumulate in the closed pores, and even if this part is small, it can contribute to the quality of the molding obtained.

FIGS. 3 to 6 illustrate a variant of the method of producing the coated elements, the conventional methods of obtaining aluminum sectors by casting being this time modified. One starts from an injection or casting mold 7 of plaster or steel which constitutes the negative of the tread pattern to be obtained. The negative may contain blades 24 the feet 25 of which protrude (FIG. 3) so as to be subsequently embedded in the liquid aluminum. A plasma beam projects the TiN powder in order to obtain a coating 5 having a porous structure of slight thickness with open porosity. For example, a film (FIG. 4) having the same properties as those indicated under method step 2 above is produced.

Then, depending on the technique employed, the aluminum 8 is poured or injected (FIG. 5) onto the mold 7 which contains the surface covering 5, whereupon the mold 7 is removed after solidification of the aluminum. The blades 24 remain anchored in the packing 21 obtained.

It is seen that the packing 21 obtained has a surface covering 5 which does not cover the blades 24, except their feet 25 embedded in the aluminum has a surface covering, which does not harm their anchoring and may even contribute to evacuating the air from the rear of the mold if one provides cutouts 26 which, as explained in French Patent No. 1,553,264, make it possible to collect the air behind the packings 21 as a result of the gap 4 present between them and the support 22 (see FIG. 1), and then out of the mold via the slits between sectors 2 and/or via paths provided for this purpose through the supports 22. It is seen that in this variant, the vent paths pass at least in part along the feet 25 of the blades 24.

This time, the condition of the molding surface of the covering 5 is determined primarily by that of the mold 7. Contrary to this, the surface finish of the coating of the first embodiment is that which results from the spraying by the plasma torch, aside from any mechanical treatment of the molding surface such as, for example, that described under method step 3 above, which may prove necessary in order to obtain the values of $R_a$ and $R_t$ indicated above. On the other hand, even without mechanical treatment, one can, in the second embodiment, very easily obtain the said roughness values, which prove very favorable for the removal from the mold or obtain any desired surface finish via the surface finish of the mold.

I claim:
1. A tire mold comprising several elements, each having a molding surface, which elements, in closed mold position, define a cavity corresponding to the tire to be molded, and vent paths connecting the said cavity to a volume outside the mold, at least one of these elements having a molding surface constituted of a nonporous solid material, the molding surface of which has at least in part a surface film of porous structure of slight thickness with open porosity, the pores of which on the surface of the mold are of a size less than 0.05 mm, said porous structure being connected with at least one of the vent paths, the value $R_a$ of the roughness of the surface film being less than 6 μm and the value $R_t$ being less than 40 μm.

2. A mold according to claim 1, in which the total porosity is greater than 10% and is open to the extent of at least 30% of the volume of the porous structure.

3. A mold according to claim 1, in which the surface film is obtained by a surface covering sprayed on by a plasma torch.

4. A mold according to claim 3, in which the surface is subjected to a finishing operation by removal of surface material of the surface covering.

5. A mold according to claim 1 in which elements which assure the molding of the tread include blades having feet which feet have a surface film of porous structure to define vent paths along the feet.

6. A mold according to claim 1, in which the vent paths are formed, at least in part, by the gaps present in closed mold position between the elements of the mold.

7. A mold according to claim 1, in which the mold is completely without any vent hole which debouches on the molding surface.

8. A mold according to claim 1, in which the thickness of the surface film is between 0.1 mm and 0.5 mm.

9. A mold according to claim 1, in which the nonporous material is metallic, and the surface film is produced from a ceramic powder or a metal powder.

10. (Amended) A mold according to claim 9, in which the powder used is a submicronic powder of TiN.

11. A method of producing a tire mold element in which liquid aluminum is poured or injected on a mold for producing the tire mold element and in which, before the pouring or injecting of the aluminum, the mold is covered with a porous film of slight thickness and open porosity, whereupon the aluminum is injected or poured and, after it has solidified, the tire mold element is removed, the tire mold element retaining the film of slight thickness and open porosity, the value $R_a$ of the roughness of the film being less than 6 μm and the value $R_t$ being less than 40μm.

12. A mold according to claim 1, in which the mold includes blades having feet anchored in the mold element which feet are covered at least in part with said porous structure in order to constitute vent paths along the feet of the blades.

13. A tire mold comprising molding surfaces enclosing a mold cavity, vent paths establishing communication between the mold cavity and an ambient atmosphere, and a surface film of porous structure defining pores on the molding surfaces which establish gas passages between the molding surfaces and the vent paths to remove gases from the mold cavity to the ambient atmosphere, the value $R_a$ of the roughness of the surface film being less than 6 μm and the value Rt being less than 40 μm.

14. A tire mold as set forth in claim 13 in which the pores are of a size less than 0.05 mm.

15. A mold as set forth in claim 3, in which the surface film obtained by a surface covering sprayed on by a plasma torch is thereafter subjected to blasting with shot of mild steel or glass balls in order to limit the surface roughness.

* * * * *